2,710,823
Patented June 14, 1955

2,710,823

FUNGICIDAL COMPOUNDS

Leon Katz, Springfield, N. J., assignor to Schenley Industries, Inc., New York, N. Y., a corporation of Delaware No Drawing. Application September 17, 1952, Serial No. 310,119

8 Claims. (Cl. 167—65)

The present invention relates to new compounds which are derivatives of 2-hydrazinobenzoxazole, possessing remarkably high fungicidal and bactericidal activity, and which also possess in vitro antitubercular activity.

The compounds of the present invention are derivatives of 2-hydrazinobenzoxazole which conform to the following general formula

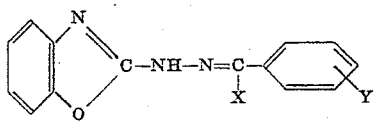

in which X is hydrogen or a lower alkyl radical and Y is a hydroxyl substituent in the 2 position, or a chloro, di-(lower alkyl)amino, carboxyl, or carboxy-substituted methoxy (—OCH$_2$COOH) radical in the 4 position, of the benzene ring. As used herein, "lower alkyl" refers to alkyl radicals containing fewer than 5 carbon atoms. Typical compounds of the present invention are those obtained by the reaction of 4-formylphenoxyacetic acid, salicylaldehyde, 4-dimethylamino benzaldehyde, 4-chlorobenzaldehyde, 2-hydroxyacetophenone, and 4-carboxybenzaldehyde, respectively, with 2-hydrazinobenzoxazole.

In my article in the Journal of the American Chemical Society (1951, vol. 73, pages 4007 to 4010), I disclosed various derivatives of 2-benzalhydrazinobenzothiazoles. Condensation products of 2-hydrazinobenzothiazole and respectively, benzaldehyde and acetophenone, had theretofore been disclosed by M. Colonna (Pubblicazioni ist. chim. univ. Bologna, 1943, No. 5, pages 3–13; Chem. Abs., 1947, vol. 41, column 754). The compounds of the present are distinguished from those prior known compounds by their surprisingly higher fungicidal activity, particularly against the organism *Trichophyton mentagrophytes*, which is one of many organisms present in common "athlete's foot" (epidermophytosis interdigium) infections.

The hydrazones of the present invention can be prepared by the condensation of one of the selected aldehydes or ketones with 2-hydrazinobenzoxazole. The preparation of the benzoxazole 2-hydrazone of salicylaldehyde, which may be represented as:

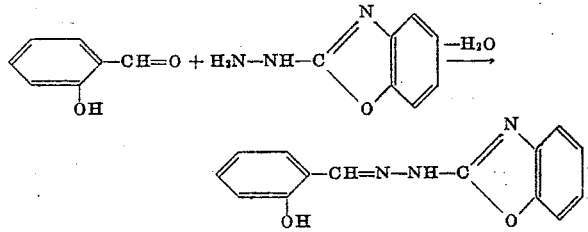

is typical of that involved in the preparation of the compounds of the invention.

For convenience in naming the compounds of the invention, they will be referred to herein as benzoxazole 2-hydrazones of the specified ketone or aldehyde, although some alternative descriptions are also indicated. It is understood, however, that the compounds may be prepared by methods other than the condensation of the aldehyde or ketone with 2-hydrazinobenzoxazole.

The following activities, which represent the concentration of the compounds in gammas per milliliter of agar nutrient that completely inhibit the growth of the organism *Trichophyton mentagrophytes* A. T. C. C. 8757, are exemplary of the compounds of this invention:

| Compound of Example No. | Name— Benzoxazole 2-hydrazone of— | Melting Point, °C | Activity (gammas/milliliter) |
|---|---|---|---|
| 1 | Salicylaldehyde | 250–251 | 25–50 |
| 2 | 2-Hydroxyacetophenone | 174–176 | 50–125 |
| 3 | 4-Formylphenoxyacetic acid | 228–229 | 100 |
| 4 | 4-Carboxybenzaldehyde | 281–282 | 125 |
| 5 | 4-Dimethylaminobenzaldehyde | 223–224 | 125–250 |
| 6 | 4-Chlorobenzaldehyde | 248–249 | 125–250 |

A mixture of undecylenic acid and its zinc salt, which are the active constituents of several commercially available products for the treatment of fungous infections of the skin, is between 125 and 250 gammas per milliliter. Benzaldehyde benzothiazole 2-hydrazone and acetophenone benzothiazole 2-hydrazone each have an activity in excess of 250 gammas per milliliter.

In general, the activity of the compounds against *Trichophyton mentagrophytes* is greater (the concentration in gammas per milliliter is smaller) in the case of the benzoxazole 2-hydrazones than that of the isologous benzothiazole 2-hydrazones.

The foregoing activity tests were performed by preparing a solution in glycerol containing 2500 gammas (2.5 milligrams) of the compound per milliliter, and dispensing aliquot parts of this solution into preselected volumes of fluid nutrient agar in test tubes, so as to prepare agar slants having concentrations of the compound of respectively 250, 125, 50 and 25 gammas per milliliter of the nutrient agar. These slants were then inoculated with a loop (0.01 milliliter) of a viable culture of the specified organism and incubated at a temperature of 37° C. for 24 hours. In the case of the *Trichophyton mentagrophytes* A. T. C. C. 8757 organism, the incubation was at prevailing room temperature for a period of at least 4 days.

The values reported in the table are approximately the minimal concentrations in gammas per milliliter that completely inhibit the growth of the organism. A value of more than 250 gammas per milliliter is without special significance, since it may be an inactive compound.

The compounds of the present invention are also active against bacteria, yeasts, and other fungi, such as *Candida albicans*, A. T. C. C. 10231, *Bacillus cereus*, NRRL B–569, *Staphylococcus aureus*, F. D. A. 209, *Escherichia coli*, A. T. C. C. 9637, *Proteus vulgaris*, NRRL B–417, *Pseudomonas aeruginosa*, Gottlieb 29, *Brucella abortus*, Gottlieb 19, and *Mycobacterium tuberculosis* A. T. C. C. 607. The activities of some of the compounds of the present invention in gammas per milliliter against some of these organisms is as follows:

Compound of Example 1—Benzoxazole 2-hydrazone of salicylaldehyde

*Candida albicans* _____ 50–125
*Bacillus cereus* _____ 125–250
*Staphylococcus aureus* _____ 125–250
*Escherichia coli* _____ 50–125
*Proteus vulgaris* _____ 50–125

Compound of Example 2—Benzoxazole 2-hydrazone of 2-hydroxyacetophenone

Bacillus cereus _____ 25
    Staphylococcus aureus_____ 25

Compound of Example 3—Benzoxazole 2-hydrazone of 4-formylphenoxyacetic acid

Bacillus cereus _____ 125–250
    Staphylococcus aureus_____ 100–200

Compound of Example 4—Benzoxazole 2-hydrazone of 4-carboxybenzaldehyde

Staphylococcus aureus_____ 125–250

All of the compounds of this invention exhibited a high activity in vitro against *Mycobacterium tuberculosis* A. T. C. C. 607, a concentration of 50 gammas per milliliter of each being sufficient to inhibit at least 95% growth of this organism.

2-hydrazinobenzoxazole can be conveniently prepared from hydrazine hydrate and the corresponding 2-chloro compound, by the general method described in my article in the Journal of the American Chemical Society, 1951, vol. 73, page 4009, for the preparation of 2-hydrazinobenzothiazole from hydrazine hydrate and 2-chlorobenzothiazole. A typical preparation of the starting compound by this method is as follows:

PREPARATION OF 2-HYDRAZINOBENZOXAZOLE

Into a 400-milliliter three-necked flask provided with a stirrer, thermometer and dropping funnel, which is immersed in an ice bath, 60 grams of hydrazine hydrate (85%, equivalent to 1.0 mole of $NH_2NH_2$) was charged. From the dropping funnel, 27.0 grams (0.175 mole) of 2-chlorobenzoxazole dissolved in 25 milliliters of dioxane was gradually added to the flask at such a rate that the temperature did not exceed 30° C. Vigorous stirring was maintained throughout the addition and was continued for 15 minutes afterwards. The slurry was diluted with 150 milliliters of water and the crystals were separated by filtration on a Büchner funnel, washed copiously with cold water, sucked dry, and then dried overnight in a vacuum oven at 65° C. The weight of the dried crystals was 24.5 grams, which is equivalent to 93% of the theoretical yield, and they had a melting point of 150–152° C.

*Example 1.*—Benzoxazole 2-hydrazone of salicylaldehyde (2-(2'-hydroxybenzalhydrazino)benzoxazole)

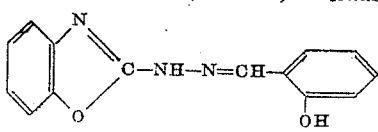

Into a 400-milliliter beaker on a hot plate were charged 70 milliliters of isopropyl alcohol, 5 milliliters of glacial acetic acid and 3.8 grams (0.025 mole) of 2-hydrazinobenzoxazole. After the solution had reached the boiling point, 3.05 grams (0.025 mole) of salicylaldehyde (Beilstein, vol. 8, page 31) was added thereto and the boiling continued with stirring for 5 minutes. The mixture was allowed to cool and the crystals were separated by filtration, washed with 200 milliliters of 50% aqueous methanol and dried in a vacuum oven at 60° C. The melting point of the product, after recrystallization from aqueous methyl Cellosolve, was 250–251° C. The product was obtained in a yield of 85% of the theoretical.

*Example 2.*—Benzoxazole 2-hydrazone of 2-hydroxyacetophenone (2 - (2' - hydroxy - α - methylbenzalhydrazino)benzoxazole)

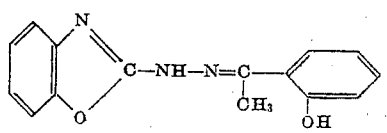

Three (3.0) grams of 2-hydrazinobenzoxazole was dissolved in a mixture of 100 milliliters of 50% aqueous methanol and 2 milliliters of glacial acetic acid. The solution was heated to boiling and 2.7 grams of 2-hydroxyacetophenone (Beilstein, vol. 8, page 85) was added and the heating at boiling temperature was continued for an additional 5 minutes. After cooling to 5° C., the precipitate was separated by filtration and dried in a vacuum oven at 60° C. The dried product weighed 4.8 grams and its melting point was 171–173° C. A sample recrystallized from aqueous ethanol had a melting point of 174–176° C.

*Example 3.*—Benzoxazole 2-hydrazone of 4-formylphenoxyacetic acid (2 - (4' - carboxymethoxybenzalhydrazino)-benzoxazole)

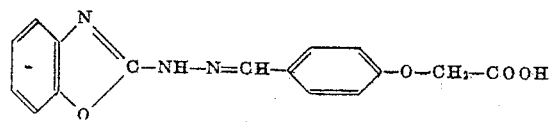

By substituting 4-formylphenoxyacetic acid (Beilstein, vol. 8, page 74) for salicylaldehyde in an equimolecular proportion, and proceeding otherwise in the manner described in Example 1, the benzoxazole 2-hydrazone having the above formula and a melting point of 228–229° C. after recrystallization from aqueous dimethyl formamide, is obtained in a yield of 88% of the theoretical.

*Example 4.*—Benzoxazole 2-hydrazone of 4-carboxybenzaldehyde (2 - (4' - carboxybenzalhydrazino)benzoxazole)

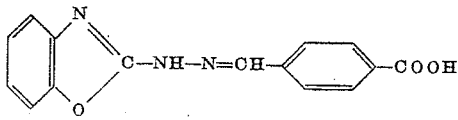

By substituting 4-formylbenzoic acid (Beilstein, vol. 10, page 671) for salicylaldehyde in an equimolecular proportion, and proceeding otherwise in the manner described in Example 1, the benzoxazole 2-hydrazone of 4-formylbenzoic acid having the above formula is obtained in a yield of 61% of the theoretical. Its melting point is 281–282° C.

*Example 5.*—Benzoxazole 2-hydrazone of 4-dimethylaminobenzaldehyde (2-(4'-dimethylaminobenzalhydrazino)-benzoxazole)

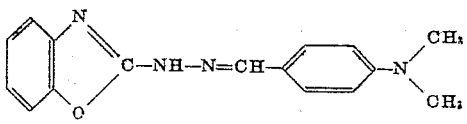

By substituting an equimolecular proportion of 4-dimethylaminobenzaldehyde (Beilstein, vol. 14, page 31) for salicylaldehyde and proceeding otherwise in the manner described in Example 1, the benzoxazole 2-hydrazone of 4-dimethylaminobenzaldehyde having the above formula is obtained in a yield of 83% of the theoretical. On recrystallization from n-butanol, the product has a melting point of 223–224° C.

*Example 6.*—Benzoxazole 2-hydrazone of 4-chlorobenzaldehyde (2-(4'-chlorobenzalhydrazino)benzoxazole)

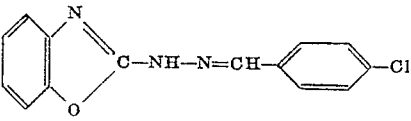

By substituting an equimolecular proportion of 4-chlorobenzaldehyde (Beilstein, vol. 7, page 235) for salicylaldehyde and proceeding otherwise in the manner described in Example 1, the benzoxazole 2-hydrazone of 4-chlorobenzaldehyde having the above formula is obtained in a yield of 91% of the theoretical. After recrystallization from n-butanol, the product has a melting point of 248–249° C.

The compounds of the present invention may be dispensed in various conventional forms for use as bactericides and fungicides. Thus, for use in the treatment of epidermophytosis interdigium, they may be applied to the affected parts in the form of ointments in conventional ointment bases. A suitable ointment is one composed of 90% petrolatum and 10% by weight of one or a mixture of two or more of the active compounds of this invention. The proportion of the active compound may be varied, for example, between the range of 5 to 20% by weight, dependent upon its activity. Other ointment bases, such as polyethylene glycol compounds, may be substituted for petrolatum. An example of such ointments is the following:

*Example 7.—Bactericidal and fungicidal ointment*

An ointment base is prepared from the following substances in the specified proportions by weight:

| | Parts by weight |
|---|---|
| Polyethylene glycol wax (average molecular weight between 3000 and 3700, solidifying range 50 to 55° C.) | 34.0 |
| Polyethylene glycol liquid (average molecular weight between 300 and 400) | 42.5 |
| Sorbitan monopalmitate (dispersing agent) | 0.85 |
| Water | 7.65 |

The polyethylene glycol wax and liquid together with the sorbitan monopalmitate are stirred together and heated to a temperature of approximately 70° C. The water is then added and the stirring is continued until the base congeals. To 85 parts by weight of the foregoing ointment base are then added with stirring the following solids as finely ground powders:

| | Parts by weight |
|---|---|
| Benzoxazole 2-hydrazone of salicylaldehyde (Compound of Example 1) | 10.0 |
| Ethyl p-aminobenzoate | 5.0 |
| β-Phenylethyl alcohol | 0.05 |

These ingredients are intimately incorporated by grinding, either by stirring while the base is maintained at approximately 70° C. or while cold in a roller or ointment mill.

Ointments containing one or a mixture of two or more of the fungicidal compounds of the invention may be prepared in a similar maner. The β-phenylethyl alcohol may be partially or completely replaced by geraniol or other suitable perfuming ingredient, or may be omitted. Other surface anesthetics such as 2-dimethylaminoethyl p-butylaminobenzoate hydrochloride may be used to replace the ethyl p-aminobenzoate. The sorbitan monopalmitate dispersing agent may be replaced by sodium lauryl sulfate.

The compounds may also be utilized in the form of vaginal suppositories prepared from conventional ingredients in conventional manners. A suitable composition for the preparation of such suppositories consists of 90 parts by weight of cocoa butter, 5 parts of spermaceti wax and 5 parts by weight of one or a mixture of two or more of the active compounds. The proportions, as is obvious, may be varied rather widely to obtain products having the desired activity. The preparation of a vaginal suppository is described in the example which follows:

*Example 8.—Vaginal suppository*

A suppository base is prepared by mixing together at approximately 50° C., the following ingredients:

| | Parts by weight |
|---|---|
| Spermaceti | 5.0 |
| Cocoa butter | 95.0 |

To this base (100 parts by weight) is then added 5 parts by weight of the benzoxazole 2-hydrazone of salicylaldehyde (Compound of Example 1) and the same is ground together until a homogeneous uniform dispersion is obtained. The dispersion is then moulded, preferably by a cold extension process, into suppositories of conventional size and shape.

Instead of the base described above, an emulsifying grade of propylene glycol monostearate may be used. Perfuming ingredients such as geraniol or β-phenylethyl alcohol, with or without chlorophyllin, may also be added if desired.

Other useful preparations containing the compounds of the invention are dusting powders, which may be prepared, for example, by mixing together 70 parts of talcum powder, 25 parts of colloidal kaolin and 5 or more parts of one or more of the active compounds. Such powders may be used in place of ointments for the treatment of epidermophytosis interdigium and may also be applied to shoes and other footwear that are carriers of the infecting organisms.

Inasmuch as the foregoing specification comprises preferred embodiments of the invention, it is to be understood that the invention is not restricted thereto and that modifications and adaptations thereof may be made in conventional manner. The invention is accordingly restricted only by the scope of the appended claims.

I claim:

1. A compound of the group consisting of benzoxazole 2-hydrazones of aldehydes and ketones represented by the general formula:

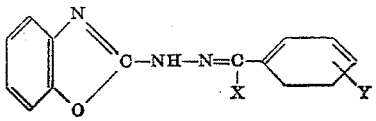

in which X is a radical of the group consisting of hydrogen and lower alkyl, and Y is a substituent radical of the group consisting of 2-hydroxyl, 4-carboxy, 4-carboxymethoxy (—OCH₂COOH), 4-di-(lower alkyl)amino and 4-chloro.

2. The benzoxazole 2-hydrazone of salicylaldehyde.
3. The benzoxazole 2-hydrazone of 2-hydroxyacetophenone.
4. The benzoxazole 2-hydrazone of 4-formylphenoxyacetic acid.
5. The benzoxazole 2-hydrazone of 4-carboxybenzaldehyde.
6. The benzoxazole 2-hydrazone of 4-dimethylaminobenzaldehyde.
7. A bactericidal and fungicidal composition comprising a compound as defined in claim 1 and conventional dispersing ingredients.
8. A bactericidal and fungicidal ointment comprising a conventional ointment base having dispersed therein a compound as defined in claim 1.

References Cited in the file of this patent

UNITED STATES PATENTS 2,073,600     Bayer _____ Mar. 16, 1937

FOREIGN PATENTS 584,381     Great Britain _____ Jan. 14, 1947

OTHER REFERENCES

Bernstein, Jr. Amer. Chem. Soc., vol. 73, pp. 906–912 (March 1951).

Katz, Jr. Amer. Chem. Soc., vol. 73, pp. 4007–10 (August 1951).

Lesser, Drug and Cosmetic Ind., 66,6, pp. 659, 744, 745, 748–52.

I. G. F., German patent application, Serial No. 176,219 (Le 3879) (Oct. 28, 1943).